Patented Nov. 6, 1945

2,388,260

UNITED STATES PATENT OFFICE 2,388,260

THERAPEUTICALLY ACTIVE AROMATIC DIAZO COMPOUNDS AND DERIVATIVES THEREOF

Ernst A. H. Friedheim, New York, N. Y.

No Drawing. Application March 11, 1942, Serial No. 434,176

7 Claims. (Cl. 167—78)

This invention relates to new condensation products formed by a reaction between aromatic diazo compounds, which may be known products or compounds of a new type described hereinafter, and the nitrogenous materials specified hereinafter, and to the method of carrying out said reaction between said diazo compounds and said nitrogenous materials. It has particular relation to the condensation of said diazo compounds with natural, high molecular nitrogenous materials extraneous to the human organism, which are capable of playing a part as a pathogenic agent, and may be isolated products, or ingredients of substances of animal or vegetable origin, or living microorganisms or their components—said condensation products being new products having no or reduced pathogenic effect in comparison with the nitrogenous substances used as starting materials.

I have made the surprising observation that diazo compounds of the structure specified hereinafter, which generally are colorless or slightly colored only, condense readily at neutral or alkaline reaction with nitrogenous materials of the above described type to form colored condensation products. Said materials comprise the pathogenic nitrogen bearing materials as exist in the form of poisons derived from cold blooded animals such as reptiles, f. e. snakes, fish, amphibia, f. e. frogs, arthropods, f. e. scorpions, spiders, mosquitos, in the form of bodies and body fractions of living and dead microorganisms, said microorganisms including protozoae, such as flagellates, f. e. trypanosomes, rhizopods, f. e. dysenteric amoebae, haematozoa, f. e. plasmodium malariae, lower forms of life, such as lower fungi, f. e. trychophyton, bacteria, bacilli, cocci, spirochaetes, ricketsia, virus, in the form of products produced by or under the action of said microorganisms such as endo- and ectotoxins, in the form of so-called allergenic substances or the allergens derived from animals, plants, and lower forms of life including pollen allergens and tuberculin. The resulting condensation products are harmless or of reduced harmfulness to human organisms. My invention may also be carried out with or in organisms containing such nitrogenous substances, for example, with living or dead bodies of microorganisms or fractions thereof. The invention is operative if said bodies of microorganisms are located in vitro or in vivo, such as on infected normal or pathological surfaces of the animal body. The components which react with the diazo compound according to my invention, are always natural, nitrogenous, high molecular materials extraneous to the human organism, and capable of playing a part as pathogenic agents in human pathology.

The diazo compounds suitable for carrying out this invention are compounds which contain or are capable of liberating a diazo group of the following formula $$[A_{n_1}-Ar-(N_2)_{n_2}] \qquad (I)$$

wherein Ar represents a radical selected from the group consisting of saturated or unsaturated, mono- or polynuclear, isocyclic or heterocyclic structures such as benzene, naphthalene, tetrahydronaphthalene, diphenyl, anthracene, pyridine, quinoline radicals, and A may be any substituent except OH and a substituent containing a free or mono-substituted amino group. $n_1$ indicates the number of A radicals. When $n_1>1$, the A-radicals may be the same or different. $(N_2)$ denotes a diazo-group, and $n_2$ the number of diazo-groups. The Ar radical may be, for example, substituted by one or more hydrogen, halogen, alkyl, O-alkyl, N-dialkyl, $NO_2$, $CONH_2$, $COOH$, $SO_3H$, $AsO_3H_2$ and groups of the formula $SO_2.E$. In this formula, E represents an amido radical selected from the group consisting of imides, such as guanidine and substituted guanimides, and amine radicals, such as $NH_2$, and dines, and amine radicals, such as $NH_2$, and mono- or disubstituted $NH_2$ groups substituted by aliphatic or aromatic components. The cyclic components may be iso- or heterocyclic, mono- or polynuclear, and saturated or nonsaturated. Thus, E may represent a $NH_2$ group which may be substituted, for example, by benzene and homologous radicals, pyridine, pyrimidine, thiazole, and triazine radicals.

I have found that the use of acid substituents, such as COOH and $SO_3H$, in the Ar radical is particularly advantageous because such acid radicals assure good solubility and the diazo compounds containing them, yield condensation products of a particularly high degree of nontoxicity. The above mentioned substituents of the Ar radical are merely illustrative, and a great number of other substituents may be used as will be understood by those skilled in the art.

According to one preferred embodiment of my invention, I use diazo compounds, in which the diazo radicals of the above mentioned group $$[A_{n_1}-Ar-(N_2)_{n_2}] \qquad (I)$$

are connected with organic acid radicals having the formula $$[D_{n_3}-Ar'-A'_{n_4}] \qquad (II)$$

wherein Ar' and A' are radicals selected from the same group as Ar and A and may be the same as Ar and A, respectively, or different, and in which D is an acid radical selected from the group consisting of COOH and SO₃H. In the simple case where $n_2=1$, the ensuing compound has the general formula

where $n_5$ may be equal to $n_3$ or smaller, but at least one. In the more complicated case: $n_2>1$, i. e. in the case of tetrazo or polyazo compounds, the ensuing compound has the general formula

Every diazo radical (N₂) must be saturated by one acid radical D. The following values are preferably assigned to $n_2$, $n_3$, $n_5$, $n_6$: For a given number of diazo radicals $n_2$ and acid radicals $n_3$, $n_5$ is maximally equal to $n_3$, it may be smaller, but must be at least one, while $n_6$ is maximally equal to $[n_3(n_2-1)+1]$ and minimally equal to $n_2$.

In another group of diazo compounds preferred in carrying out my invention, the linkage between the diazo radical and the acid radical is formed within the same molecule. These compounds belong to the type of internal salts, wherein the ring system carrying the diazo group or groups is substituted by at least the same number of acid radicals as diazo groups according to the general formula

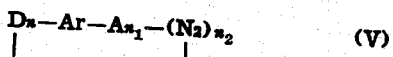

wherein $n \geq n_2$, and preferably $n$ and $n_2$ are the same and equal to 1 or 2. Such preferred compounds are p-diazo-benzene-sulfonic acid of the formula

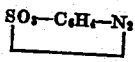

and 4,4'=tetrazo=3,3'=benzidine disulfonic acid of the formula

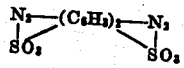

The reaction between the diazo compound and the high molecular nitrogenous compound according to my invention takes place according to the following schemes written for the simplest case:

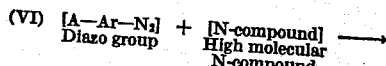

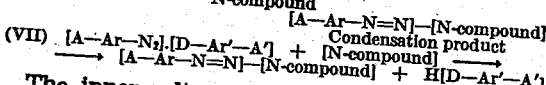

The inner salts of the above Formula V are hydrolyzed in contact with water to form ampholeric ions of the formula (VIII) 

said ions reacting with the nitrogenous materials according to scheme V.

While all reaction products embodying the present invention are characterized by the —N=N— bridge, this bridge may be linked up with a pathogenic material in two different ways: (1) said bridge may be linked up with a nitrogen atom or (2) this bridge may be linked up with a cyclic carbon atom of the high molecular nitrogenous material.

I have found that the above mentioned toxic products are rendered non-pathogenic or considerably less pathogenic if subjected to condensation with diazo compounds according to my invention. If the diazo compounds are caused to react with living forms of microorganisms, the formation of my condensation products results in killing of most of the living forms of said microorganisms, as the condensation introduces foreign radicals into their body substance. Spores and acid fast microorganisms show also in this case their known higher resistance to chemical influences.

It has been found that the introduction of a maximum amount of —N=N— links into the high molecular nitrogenous material results in optimum effect as to detoxification and germicidal action. For practical purposes, the amount of the diazo compound necessary for such saturation, may be calculated as corresponding to at least one mol of diazo compound for every nitrogen atom present in the reacting high molecular nitrogenous compound.

I have further found, however, that in certain cases particularly valuable condensation products in which the specific antigen properties are preserved to a high extent, may be obtained by using smaller amounts of the diazo compound, as will be more fully explained hereinafter.

The reaction between the high molecular nitrogenous compounds and the diazo compounds according to my invention is usually completed in vitro after 24 hours of standing of the aqueous reaction medium at a temperature not exceeding 10° C. The reaction may be carried out in one step or in several subsequent steps, e. g. by adding a part of the diazo compound to the nitrogenous substance, and adding a further amount of the diazo compound after condensation of the first portion has been completed. The reaction is, however, often completed within 10 minutes. An eventual excess of the diazo compound can be eliminated from the reaction mixture after completion of the condensation by dialysis or by addition of an indifferent coupling partner, such as an amino acid, e. g. glycocoll, or by treatment with metallic copper, preferably in the form of Naturkupfer C (see F. Ullmann, Enzyklopädie der technischen Chemie, vol. 3, 1916, page 135, par. 2 from the bottom).

The process of preparing the compounds embodying the present invention substantially consists in causing to react the diazo compound with the high molecular, nitrogenous substance in a neutral or alkaline, aqueous reaction medium. The pH range between 6.8–8.4 is preferred. For example, a neutralized aqueous solution of the diazo compound may be run into a solution of a toxin or poison, or a neutral, aqueous solution of the diazo compound may be introduced into the human body by intravenous injection. Or an acid solution of the diazo compound may be introduced in vitro into a solution of the nitrogenous compound, which contains sufficient alkali, such as NaHCO₃, for securing a suitable pH of the resulting reaction mixture. The diazo compound may also be used in solid form. A solid, preferably finely pulverized diazo compound may be added, for example, to a liquid, high molecular, nitrogenous substance, or a liquid medium containing such substance and being suitably buffered. A similar use of the solid diazo compound may be made in vivo by bringing it in contact with an infected normal or pathological surface of the animal body, such as skin, mucous membranes, pleura, peritoneum and wounds. The moisture prevailing commonly on such surfaces is usually sufficient to bring about dissolution of the diazo compound permitting contact and reaction with the pathogenic material. Otherwise the necessary amount of moisture may be applied in the form of water or preferably a physiological salt solution. Applied to infected surfaces of an animal body, the diazo compounds react readily with the infecting living microorganisms, their high molecular, nitrogenous toxic, meta- and catabolic products, as well as with the surface of the tissues. While most species of living microorganisms are killed by this reaction, the host cells are substantially not damaged but only colored on their surface.

If the reaction between the diazo compound is to be carried out on surfaces of the animal body, such as in wounds, a physiological pH of the aqueous reaction mixture should be assured. According to this embodiment of my invention, I may use, therefore, the diazo compounds in mixture with a salt buffer selected from the group consisting of primary and secondary alkali phosphates, and primary and secondary alkali carbonates. Furthermore, requirements of medical dosage may call in such cases for the use of a diluent which is nontoxic and nonirritant, readily resorbed from the body surfaces, and, of course, does not react with diazo radicals. As such diluent, I prefer to use a neutral alkali salt of an organic acid radical of the formula—(D—Ar').

The use of an alkali carbonate as a salt buffer in mixture with a compound carrying at least one free acid radical, or an acid radical capable of being set free by hydrolysis, results in the advantageous effect of liberating $CO_2$. On applying, for example, such a mixture to the moist surface of a wound, gaseous $CO_2$ is set free, which forms a foam with the secretions of the wound, thus contributing to the mechanical cleansing of the wound, as the foam carries extraneous particles, which may be present in the depth of the wound, to the surface. The above mentioned acid radical may be present in the molecule carrying the diazo radical or in the diluent (see Examples VII and VIII). If the molecule carrying the diazo radical is a salt, the acid radical may be a substituent of Ar or Ar'.

In carrying out my present invention by the application of a diazo compound to the animal body, I have found that a particular advantage may be obtained by the use of diazo derivatives of aromatic amines known to have a particular chemo-therapeutic effect, such as sulfanilamide and the products derived from the same by substitution in the $SO_2NH_2$ group. By applying diazo derivatives of such aromatic amines to a wound of the human body, for example, the high molecular, nitrogenous organic substances of microorganisms present in the wound, and their meta- and catabolic products, and the diazo derivatives of said aromatic amines form detoxified condensation products which may be converted in the course of time within the human organism with liberation of free sulfonamides which may then exert their specific chemo-therapeutic effect in statu nascendi.

Thus, in carrying out this embodiment of my present invention, the diazo compounds of said aromatic amines have an effect which classes them as local antiseptics, and in their use, the new antiseptic and detoxifying effect obtained according to my invention is automatically combined with the typical chemo-therapeutic effect of free sulfonamides.

The compounds used in this embodiment of my invention are sulfonamide derivatives of diazobenzene. While the treatment of acid solutions of sulfanilamides with nitrous acid has been described, and while such solutions have been used for the preparation of azo dyestuffs, and azides, free diazo bases, and especially stable diazo compounds of benzene sulfonamides and their substitution products have not been isolated or prepared, respectively, in dry solid form prior to my invention. I have prepared these compounds according to the method described in detail hereinafter.

The above mentioned sulfonamide derivatives of diazobenzene have the general formula $$X—[N_2—C_6H_4—SO_2Y]_n$$

wherein X is selected from the group consisting of OH, O-alkali, inorganic acid groups, and radicals of aliphatic or preferably cyclic sulfonic acids, said radicals having no substituent selected from the group consisting of —OH and a substituent containing a free or mono substituted amino group, $n$ being equal to the number of diazobenzene sulfonamide groups connected to X, and Y is a nitrogenous radical selected from the group consisting of aliphatic and aromatic secondary or preferably primary amino and imino radicals. If X is the radical of a di- or polybasic acid, $n$ is equal to or smaller than the valency of said acid, but at least one. As to the nature of cyclic sulfonic acids taking the place of X, saturated and unsaturated, mono- and polynuclear, and mono- and polysulfonic iso- and heterocyclic acids may be used. Benzene- and naphthalene mono- and polysulfonic acids answer all practical purposes. In view of their ready availability, benzene mono- and disulfonic acid, naphthalene=1,5=disulfonic acid, naphthalene=1,3,6=trisulfonic acid, and naphthalene, 1,3,6,8—tetrasulfonic acid are preferred. Further examples are: Toluene mono-, di- and trisulfonic acid, and tetrahydronaphthalene disulfonic acid. The cyclic sulfonic acids may be substituted by one or more halogen, alkyl, N-alkyl, N-dialkyl, $NO_2$, COOH, $CONH_2$, $SO_2NH_2$ radicals, for example. The new primary bactericidal and detoxifying effect of these diazobenzene derivatives according to my invention is not substantially influenced by the nitrogenous radical taking the place of Y in the above general formula, as said effect is a function of the diazo radical in the condensation with high molecular, nitrogenous compounds. As examples of the radicals taking the place of Y, the following may be mentioned: $NH_2$, NH-alkyl, N-dialkyl, NH acyl, $$NH—(CH_2)n—NH_2, NH(CH_2)n—$$
$$OHOH, NH(CH_2)n—CONH_2$$

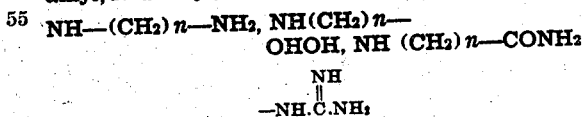

isocyclic nitrogenous radicals, such as aniline, naphthylamine and their substitution products.

I prefer to use such nitrogenous radicals which produce a specific chemo-therapeutic effect when combined with the $NH_2—C_6H_4—SO_2=$radical such as amino derivatives selected from the group consisting of amino-pyridine, amino-pyrimidine, amino-thiazole and guanidine and substituted guanidines. As preferred examples of suitable compounds, the benzene- and naphthalene- mono-, di- and polysulfonates of p-diazo-benzene-sulfonamido-pyridine (diazo sulfapyridine), p-diazo-benzene-sulfonamido-pyrimidine (diazo sulfadiazine), p-diazo-benzene-sulfonamido-thiazole (diazo sulfathiazole), p-diazo-benzene-sulfonyl-guanidine (diazo sulfaguanidine) and p-diazo-benzene-sulfonyl-acetyl-imide (diazo sulfamyd) may be mentioned. Sulfonamide derivatives of diazo-benzene, in which a sulfonic acid with more than one $SO_3=$ radical is combined with more than one diazobenzene sulfonamide radical, and derivatives, in which free sulfonic acid radicals are transformed into their alkali salt, may also be used.

If such sulfonamide derivatives of diazobenzene are injected intravenously to a human organism, they condense readily with high molecular, nitrogenous constituents of the circulating blood. In the condensation product formed, benzene-sulfonamide radicals are stored in a masked form which is not eliminated by the kidney, and from which low molecular benzene sulfonamide derivatives are set free within the organism.

*Example I.*—100 cc. of a diphtheria toxin obtained and purified according to known methods, and corresponding to 20 LF units per cc., are cooled to 5° C., and caused to react under stirring with 3 cc. of a 1% neutralized, aqueous solution of freshly recrystallized p-diazobenzene sulfonic acid. The reaction mixture, which takes up an orange-red color, is kept at about 8° C. for about 12 hours. After this period of time the free diazo compound has disappeared in the solution, and formation of a condensation product from the toxin and the diazobenzene sulfonic acid is completed. Tests made with this solution in experiments on animals show that the reaction product is 800,000 times less toxic than the toxin used as starting material, while flocculation test shows that the specific antigen effect of binding and flocculating diphtheria serum is not decreased in comparison with the original toxin used.

*Example II.*—1 g. of dried poison of Lachesis alternatus is dissolved in 10 cc. of a phosphate buffer solution mol/15, pH 7.3. To this ice-cold solution 33 cc. of a 1% solution of p-diazobenzene sulfonic acid are added drop by drop under stirring. The reaction mixture, which takes up an orange-red color almost instantaneously, is kept at about 5° C. for about 24 hours, after which period no free diazo compound can be found in the solution. A dose of 200 mg./kg. of the condensation product thus formed can be administered without adverse effect to mice by intravenous injection, while a dose of 0.75 mg./kg. of the original poison used here as starting material, is lethal to mice.

*Example III.*—10 cc. of an ice-cold solution of purified tuberculin, prepared according to Seibert (Am. Rev. of Tuberculosis, Suppl. 1934, 30, p. 707), in a m/15 mol phosphate buffer solution, pH 7.4, are gradually mixed under stirring with 7.2 mg. of freshly recrystallized p-diazobenzene sulfonic acid. The reaction mixture, which takes up an orange-red color, is kept at about 5° C. for about 12 hours, after which period no free diazo compound can be detected in the solution. While intracutaneous injection to tuberculous guinea pigs of $10^{-7}$ g. of the original tuberculin here used causes a distinct reaction (erythema of 15 mm. diameter), the reaction product prepared according to this example can be injected under substantially similar conditions to guinea pigs in a 10,000 times higher dose without causing a reaction.

*Example IV.*—To an ice-cold aqueous solution of pH 7.6, containing 1% of the extractive substances of the water-soluble fraction obtained according to known methods from Artemisa tenuifolia, 35 mg. of crystallized p-diazobenzene sulfonic acid are added under shaking. The crystals go into solution, and the reaction mixture takes up a reddish-brown color. After keeping this reaction mixture at about 8° C. for about 15 hours, no free diazo compound can be found in the solution. If the untreated starting material here used is administered by intracutaneous injection to an allergic patient in a dose corresponding to 0.000001 g. of nitrogen, it causes a strong reaction, while the condensation product obtained according to this example can be administered, without causing a reaction, in an 8,000 times higher dose.

*Example V.*—50 cc. of a 1% lobster extract obtained according to known methods and buffered to pH 7.6, is gradually mixed under stirring with 0.25 g. of crystallized diazobenzene sulfonic acid. The reaction mixture, which takes up a reddish-brown color, is kept at about 8° C. for about 48 hours, after which period no free diazo compound is present in the solution. If the original extract here used is administered by intracutaneous injection in a dose corresponding to 0.0000001 g. of nitrogen to an allergic patient, it causes a distinct reaction (erythema), while a 10,000 times higher dose of the product here obtained can be administered under substantially similar conditions without causing a reaction.

*Example VI.*—100 cc. of a suspension of virulent typhus bacilli in physiological sodium chloride solution containing $5.10^9$ bacilli per cc., and obtained by dispersing a 24 hours old culture of typhus bacilli on nutritive agar, are cooled to 2° C., and mixed under stirring with 10 cc. of a 1% neutralized solution of p-diazobenzene sulfonic acid. Upon mixing said suspension with said solution, the suspended bacilli take up a brownish-red color almost instantaneously, and inoculation tests on bouillon show that the suspension is sterilized within 15 minutes. The colored bodies of bacteria are then centrifuged and used for immunizing guinea pigs. A serum obtained after 14 days from the latter agglutinates untreated typhus bacilli with a titer 1:300. While 1 cc. of the original suspension sterilized by heat, causes severest symptoms when intraperitoneally administered to guinea pigs, a five times higher number of the bacilli condensed with the diazo compound as described above, can be applied under similar conditions without causing any symptoms.

In the above examples, p-diazobenzene sulfonic acid may be substituted by any other compound of the above Formula I or preferably III.

*Example VII.*—A finely pulverized mixture is prepared by mixing equimolecular parts of diazobenzene sulfonic acid, sodium carbonate, and sodium benzenesulfonate. This mixture is applied by dusting it on wounds either for prophylactic or therapeutic purposes.

*Example VIII.*—One part by weight of benzenesulfonate of diazobenzene sulfonamide, and 2 parts by weight of an equimolecular mixture of toluene sulfonic acid and sodium carbonate, are intimately mixed and applied to wounds in solid form by dusting. Instead of the benzenesulfonate of diazobenzene sulfonamide, one part by weight of the corresponding toluene-sulfonate may be used.

In order to prepare the benzene-sulfonate of diazo-benzene sulfonamide, a solution of 17.6 g. of p-amino-benzene sulfonamide in 100 cc. of water and 25 cc. of hydrochloric acid (D=1.19) and 50 g. of ice, is treated at 3° C. with a solution of 6.9 g. of sodium nitrite dissolved in 35 cc. of water. On addition of 15.8 g. of benzene-sulfonic acid to the yellowish solution, a white crystalline precipitate of benzenesulfonate of diazobenzenesulfonamide is formed, which is filtered off, and washed with ice-water, alcohol and ether. Yield: 23.5 g. The compound is soluble in water, and dilute acetic and hydrochloric acid. The colorless aqueous solution yields on addition of sodium acetate or sodium bicarbonate an amorphous, yellow precipitate of free diazobenzenesulfonamide. The aqueous solution is neutral and couples with R salt and naphthylamine to form red azo-dyes.

The compound may be recrystallized out of warm water. It stands heating up to 110° C., while at higher temperatures it becomes soft and discolored, and is decomposed at about 128° C.

In order to prepare the toluenesulfonate of diazobenzene sulfonic acid, 1 part by weight of diazobenzene sulfonate and 1.1 parts by weight of toluene-sulfonic acid are suspended in 8 parts of water. The suspension is stirred for 1 hour at 25° C. and kept for 12 hours at 5° C. The white precipitate of toluenesulfonate of diazobenzene sulfonic acid is then filtered off, and washed with ice-water, ethylalcohol and ether. The compound can be safely dried at 80° C.

*Example IX.*—Equal parts of solid, crystallized diazobenzene sulfonic acid, prepared according to classical method, and benzene sulfonic acid are dissolved in 20 parts of warm water of about 80° C. On cooling, a white crystalline precipitate of benzenesulfonate of diazobenzene sulfonic acid is obtained, which is filtered off, and washed with acetone and ether.

The product thus prepared may be used in an equimolecular mixture with sodium carbonate and an appropriate diluent such as disodium naphthalene disulfonate.

*Example X.*—20 cc. of molten benzenesulfonic acid are added to a solution of 257 g. of sulfathiazole in 450 cc. of water, and 25 cc. of hydrochloric acid (D=1.19). A white precipitate of sulfathiazole benzenesulfonate is formed. Regardless of this precipitate, 300 g. of ice, and, with efficient stirring, 7.02 g. of sodium nitrite dissolved in 30 cc. of water, are added to the reaction mixture. Stirring is continued until all of the white sulfathiazole benzenesulfonate is replaced by a yellow precipitate consisting of diazothiazole benzenesulfonate which is filtered off, washed with ice-water, acetone and ether. The yield is 37 g., i. e. 86.6% of the theoretical amount.

The compound thus obtained is soluble in water, and couples with R salt to form an azo dye.

It may be used for forming condensation products according to my invention, without any admixture or in a mixture similar to that described in Example IX, by dusting it on wounds.

*Example XI.*—A solution of 29 g. of sulfapyridine in 250 cc. of water and 40 cc. of hydrochloric acid (D=1.19), and 200 g. of ice is diazotized by the addition of 7.0 g. of sodium nitrite dissolved in 35 cc. of water. Diazosulfapyridine precipitates in form of fine, yellow needles which are filtered off, washed with a small amount of ice-water, and redissolved in 300 cc. of methanol. To the filtered alcoholic solution, 37 cc. of molten benzenesulfonic acid are added with good shaking and cooling. A yellow, crystalline precipitate of diazosulfapyridine benzenesulfonate is formed, which is filtered off, and washed with methanol and ether. The yield amounts to 25 g., i. e. 64% of the theoretical value.

The compound is slightly soluble in cold water to a clear solution which becomes cloudy on standing. While the free diazonium base is readily soluble in ethanol and methanol, its benzenesulfonate is not soluble in these solvents nor in acetone and dioxane. While the free diazonium base, in solid, dry form, is decomposed on heating to about 78°–80° C., its benzenesulfonate is stable to about 130° C. An aqueous solution of the latter couples readily with an alkaline solution of R salt, and an acid solution of naphthylamine to form red azo dyes.

The diazosulfapyridine benzene sulfonate may be reacted according to my present invention with high molecular, nitrogenous compounds, for example, in the manner described in Example XI.

*Example XII.*—One part by weight of a mixture consisting of 1 mol of (4,3)-4',3'-tetrazodiphenyl-disulfonic acid, and two mols of sodium carbonate, is mixed with an equal part of a diluent such as sodium benzene sulfonate. The mixture may be applied to wounds by dusting.

*Example XIII.*—One part by weight of a mixture consisting of 1 mol 1,4,8 diazonaphthalene-disulfonic acid, and 1 mol of sodium carbonate, is applied to wounds by dusting, with the addition of a diluent if desired.

*Example XIV.*—One mol each of the acid salt of naphthalene-1,5 disulfonic acid and diazosulfapyridine is mixed with 2 mols of sodium bicarbonate, and equal parts by weight of this mixture and trisodium-naphthalene-trisulfonate to a finely pulverized, homogeneous product which may be applied to infected surface of the living human body by dusting. The trisodium-naphthalene-trisulfonate which acts as a diluent, may be used in a greater proportion or may be partly or entirely omitted.

The diazo compound here used may be obtained by preparing diazosulfapyridine in the manner described in Example XI, and reacting an alcoholic solution of this compound with an equimolecular quantity of naphthalene-1,5-disulfonic acid.

*Example XV.*—One part by weight of an equimolecular mixture of p-diazobenzoic acid

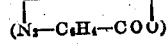
$(N_2-C_6H_4-COO)$ and sodium carbonate, is mixed with 2 parts by weight of neutral sodium benzene disulfonate as diluent. The amount of the latter may be varied in accordance with the requirements of dosage.

The above examples illustrate the great number of possible embodiments of my present invention.

While in the combating of pathological phenomena caused by pathogenic materials, particularly those caused by bacteria, various azo compounds have been suggested and used, such as a great number of the so-called azo dyestuffs containing an $N_2$ group (—N=N—) between aromatic components derived from coal tar, and having a pronounced bright color of their own, I have discovered that another class of $N_2$-compounds, i. e. diazo compounds of the type here disclosed, which generally are colorless or slightly colored only, may give even better results in combating pathological phenomena, and allow of a much wider use, or, in other words, allow of rendering harmless or less harmful a much greater number of pathogenic materials.

As shown by the above description and examples, the "pathogenic materials," with which the diazo compounds may be reacted according to my present invention to form new condensation products, which are nontoxic or less toxic than the untreated pathogenic materials, include broadly high molecular, nitrogenous substances as exist in the form of poisons derived from cold-blooded animals, or in the form of microorganisms, and toxic products produced by or under the action of said microorganisms, and also in the form of the so-called allergenic substances or allergens derived from animals or plants or from lower forms of life.

It will be understood that the process of carrying the condensation according to my invention into effect, and also the specific composition of the diazo compound used, must be varied within the broad limits of my invention, depending primarily on the nature of the high molecular nitrogen-bearing pathogenic material. For example, it is well known, that diseases caused by pathogenic materials can be combated by either prophylactic or therapeutic treatment. Both of these methods of treatment may be supported or brought about by following the course of my invention. In the production of vaccine, I treat a toxin or a living microorganism in vitro with a diazo compound, and use the condensation product formed for prevention of infectious diseases. Similar steps may be taken in combating other pathological phenomena such as allergic diseases. A direct therapeutic effect brought about by the destruction of pathogenic material in vivo, is obtained, for example by applying a diazo compound according to this invention to an infected wound.

Applying this invention to pathogenic substances derived from lower forms of life, which cannot be isolated in a substantially pure form, as is possible with bacterial suspensions, in applying the invention, for example, in the case of virus diseases, such as poliomyelitis, or in ricketsia diseases, such as typhus, the condensation according to my invention may be carried out by reacting the diazo compound with a suitable pathogenic material, such as finely divided spinal cord of monkeys infected with poliomyelitis or spleen pulp of guinea pigs infected with typhus exanthematicus or culture media containing the virus or ricketsia.

In order to destroy microorganisms, particularly bacteria, and to combat the substances produced by and/or under the action of the same, in a living animal body, I cause said microorganisms, and/or said substances, to react with a suitable diazo compound. This can be effected, as already explained above in detail, by bringing said diazo compounds in contact with said microorganisms and substances, wherever they are present, such as in infected wounds or on other infected surfaces of the living animal body, or in vitro. Said diazo compounds may also be used by direct application in the treatment of mouth, nose, eyes, sinuses and the urogenital system. In this embodiment of my invention, the above described solid mixtures comprising diazo compounds, buffer substances and/or diluents, proved to be of particular value.

The above described sulfonamide derivatives of diazobenzene are new compounds combining in a new way two effects. First, the new detoxifying and bactericidal effect, which I call a primary effect, and which is based on the presence of the diazo group and its property to link up with the high molecular nitrogenous materials, and second, the typical therapeutic effect due to sulfonamides which are liberated within the organism after parenteral administration such as intravenous injection or local application to infected surfaces.

The new sulfonamide derivatives of diazobenzene according to my invention, may be prepared according to the following general methods.

A sulfonilamide compound is diazotized in the usual way in acid aqueous solution, and the diazo compound thus formed is then reacted with an organic acid of the general formula D—Ar′. This can be done in solution or in suspension either after isolation of the diazo compound in form of the free diazo base or in form of an inorganic salt thereof, or by reacting the diazo compound dissolved or suspended in the original reaction medium. Finally, the sulfanilamide compound may be diazotized in the presence of the organic acid.

It is to be understood that in the present specification and claims, the term "buffer salt" denotes a salt which is used for maintaining a desired pH value, and is preferably selected from primary and secondary sodium phosphates and primary and secondary sodium carbonates. The term "diluent" used in the present specification and claims denotes a substance which is nontoxic and non-irritant, is readily resorbed from surfaces of the living animal body and does not react with diazo radicals.

As will be understood from the above formulas, the term "cyclic diazo compound" is used in this specification and the claims as a general term including aromatic and other cyclic compounds characterized by one diazo group $(N_2)$, or more diazo groups, such as in tetrazo and polyazo compounds.

In the appended claims the term "microorganisms" is understood to include protozoa, such as flagellates, for example trypanosomes, rhizopods, for example dysenteric amobae, haematozoa, for example plasmodium malariae; lower forms of life selected from the group consisting of lower fungi, for example trychophyton; bacteria, bacilli, cocci, spirochaetes, ricketsia and virus.

Numerous modifications and variations of the invention, as hereinbefore set forth, may be made without departing from the spirit and scope thereof, and, therefore, only such limitations should be imposed as are included in the appended claims.

I claim:

1. A reaction product of a natural, high molecular, nitrogenous material capable of playing a part as a pathogenic agent, said nitrogenous material being selected from the group consisting of poisons secreted by cold-blooded animals, bodies of microorganisms and endotoxins and exotoxins produced by said microorganisms, with a diazonium salt containing or capable of liberating a group of the formula

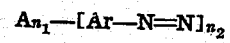

wherein Ar represents a residue of a diazotizable amine selected from the group consisting of mono- and polynuclear aromatic radicals, pyridine and quinoline radicals, A is a substituent selected from the group consisting of carboxyl, and $SO_3H$ radicals, $n_1$ represents the number of A radicals, there being no more than one such A group for any aryl ring, and the system

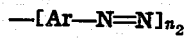

being selected from the group consisting of aryl-diazo and diphenyltetrazo radicals.

2. A reaction product of a natural, high molecular, nitrogenous material capable of playing a part as a pathogenic agent, said nitrogenous material being selected from the group consisting of poisons secreted by cold-blooded animals, bodies of microorganisms and endotoxins and exotoxins produced by said microorganisms, with a diazonium salt of the formula $$D_n—[Ar—N{=}N]_{n_2}$$

wherein Ar represents a residue of a diazotizable amine selected from the group consisting of mono- and polynuclear aromatic radicals, pyridine and quinoline radicals, D is an acid radical selected from the group consisting of COO and SO$_3$, and the ring system carrying the diazo groups is substituted by at least the same number of acid radicals as diazo-groups, $n$ denotes the number of D radicals, and the system $$—[Ar—N{=}N]_{n_2}$$

is selected from the group consisting of aryldiazo and diphenyltetrazo radicals.

3. A process for preparing vaccines, said process comprising reacting in vitro a product comprising a natural, high molecular, nitrogenous material capable of playing a part as a pathogenic agent, said nitrogenous material being selected from the group consisting of poisons secreted by cold-blooded animals, bodies of microorganisms and endotoxins and exotoxins produced by said microorganisms, with a diazonium salt containing or capable of liberating a group of the formula $A_{n_1}—[Ar—N{=}N]_{n_2}$ wherein Ar represents a residue of a diazotizable amine selected from the group consisting of mono- and polynuclear aromatic radicals, pyridine and quinoline radicals, A is a substituent selected from the group consisting of a carboxyl, and SO$_3$H radicals, $n_1$ represents the number of A radicals, there being no more than one such A group for any aryl ring, and the system —[Ar—N=N]$_{n_2}$ being selected from the group consisting of aryldiazo and diphenyltetrazo radicals.

4. A process for preparing vaccines, said process comprising reacting in vitro a product comprising a natural, high molecular, nitrogenous material capable of playing a part as a pathogenic agent, said nitrogenous material being selected from the group consisting of poisons secreted by cold-blooded animals, bodies of microorganisms and endotoxins and exotoxins produced by said microorganisms, with a diazonium salt containing or capable of liberating a group of the formula $A_{n_1}—[Ar—N{=}N]_{n_2}$ wherein Ar represents a residue of a diazotizable amine selected from the group consisting of mono- and polynuclear aromatic radicals, pyridine and quinoline radicals, A is a substituent selected from the group consisting of carboxyl, and SO$_3$H radicals, $n_1$ represents the number of A radicals, there being no more than one such A group for any aryl ring, and the system —[Ar—N=N]$_{n_2}$ being selected from the group consisting of aryldiazo and diphenyltetrazo radicals, said diazo compound being used in an amount less than that corresponding to the ratio necessary for substantially complete saturation of the reactive nitrogen atoms in said high molecular nitrogenous material.

5. A condensation product of the type claimed in claim 1, in which the ratio of the diazo component combined with the high molecular nitrogenous substance is less than that corresponding to the amount necessary for substantially complete saturation of the groups capable of coupling with said diazo compound, contained in said high molecular nitrogenous substance.

6. A method of obtaining a condensation product as claimed in claim 1, from the reaction components recited in claim 1, said method comprising reacting the high molecular, nitrogenous, pathogenic material and the diazo compound in an aqueous reaction medium having a pH of higher than 5.7.

7. A method of obtaining a condensation product claimed in claim 1 from the reaction components recited in claim 1, said method comprising bringing in contact the solid diazo compound with the high molecular, nitrogenous, pathogenic material in the presence of water at a pH of higher than 5.7.

ERNST A. H. FRIEDHEIM.